United States Patent
Lin et al.

(10) Patent No.: US 12,345,340 B2
(45) Date of Patent: Jul. 1, 2025

(54) MULTI-WAY VALVE

(71) Applicants: Zhejiang Geely Holding Group Co., Ltd., Zhejiang (CN); ZHEJIANG LIANKONG TECHNOLOGIES CO., LTD, Zhejiang (CN)

(72) Inventors: Bingrong Lin, Zhejiang (CN); Junbo Xu, Zhejiang (CN); Guibin Li, Zhejiang (CN); Qiang Xue, Zhejiang (CN); Haijiang Dai, Zhejiang (CN)

(73) Assignees: Zhejiang Geely Holding Group Co., Ltd., Zhejiang (CN); ZHEJIANG LIANKONG TECHNOLOGIES CO., LTD, Zhejiang (CN)

( * ) Notice: Subject to any disclaimer, the term of this patent is extended or adjusted under 35 U.S.C. 154(b) by 52 days.

(21) Appl. No.: 18/512,060

(22) Filed: Nov. 17, 2023

(65) Prior Publication Data

US 2024/0084903 A1    Mar. 14, 2024

Related U.S. Application Data

(63) Continuation of application No. PCT/CN2022/088248, filed on Apr. 21, 2022.

(30) Foreign Application Priority Data

Sep. 27, 2021    (CN) .......................... 202111138840.0

(51) Int. Cl.
*F16K 11/085*    (2006.01)
*F16K 31/04*    (2006.01)

(52) U.S. Cl.
CPC ........ *F16K 11/0856* (2013.01); *F16K 31/043* (2013.01)

(58) Field of Classification Search
CPC . F16K 11/0856; F16K 11/085; F16K 11/0836
See application file for complete search history.

(56) References Cited

U.S. PATENT DOCUMENTS 11,932,078 B2 *    3/2024    Pinto ................. B60H 1/00899
12,228,214 B2 *    2/2025    Surve ................. F16K 11/0856
(Continued)

FOREIGN PATENT DOCUMENTS

| CN | 202381754 | 8/2012 |
| CN | 206860950 | 1/2018 |

(Continued)

OTHER PUBLICATIONS

"Search Report of Europe Counterpart Application", issued on Aug. 26, 2024, p. 1-p. 9.

(Continued)

*Primary Examiner* — Michael R Reid
(74) *Attorney, Agent, or Firm* — JCIPRNET (57) ABSTRACT

A multi-way valve includes a valve seat and a valve core. The valve core is rotatably disposed in the valve seat, the valve seat is provided with a plurality of valve port groups, each valve port group includes a plurality of valve ports, the valve core is provided with communication structure groups corresponding to the valve port groups, respectively, and each of the communication structure groups further includes a plurality of communication structures arranged along a circumferential direction of the valve core. When the valve core is rotated to different rotation positions, valve ports in different valve port groups form different communication states. Only one valve core is required to make a two-way proportional valves, three-way proportional valve, and a four-way proportional valve achieve different communication states, with simple control, compact structure and low cost.

8 Claims, 6 Drawing Sheets

(56) References Cited

U.S. PATENT DOCUMENTS

2017/0254425 A1 9/2017 Takamatsu et al.
2020/0171914 A1 6/2020 Han et al.
2021/0131575 A1 5/2021 Bunda et al.
2022/0316607 A1* 10/2022 Surve .................. F16K 27/065

FOREIGN PATENT DOCUMENTS

| | | |
|---|---|---|
| CN | 107725836 | 2/2018 |
| CN | 109899565 | 6/2019 |
| CN | 110043692 | 7/2019 |
| CN | 110529628 | 12/2019 |
| CN | 210290845 | 4/2020 |
| CN | 111255918 | 6/2020 |
| CN | 111828687 | 10/2020 |
| CN | 112709843 | 4/2021 |
| CN | 112780805 | 5/2021 |
| CN | 112879601 | 6/2021 |
| CN | 214222094 | 9/2021 |
| CN | 214274578 | 9/2021 |
| CN | 113864490 | 12/2021 |
| JP | S62009764 | 1/1987 |
| JP | 2012047192 | 3/2012 |
| JP | 2021017916 | 2/2021 |
| WO | 2006025054 | 3/2006 |
| WO | 2015031890 | 3/2015 |
| WO | 2021121922 | 6/2021 |

OTHER PUBLICATIONS

"Office Action of Japan Counterpart Application", issued on Sep. 18, 2024, with English translation thereof, p. 1-p. 12.
"International Search Report (Form PCT/ISA/210) of PCT/CN2022/088248," mailed on Jul. 21, 2022, with English translation thereof, pp. 1-8.
"Written Opinion of the International Searching Authority (Form PCT/ISA/237) of PCT/ CN2022/088248," mailed on Jul. 21, 2022, with English translation thereof, pp. 1-6.
"Office Action of China Counterpart Application", issued on Sep. 12, 2023, with English translation thereof, pp. 1-8.
"Notice of allowance of China Counterpart Application", issued on Feb. 5, 2024, with English translation thereof, p. 1-p. 7.
"Notice of Allowanceof Japan Counterpart Application", issued on Jan. 24, 2025, with English translation thereof, p. 1-p. 5.

* cited by examiner

MULTI-WAY VALVE

CROSS-REFERENCE TO RELATED APPLICATIONS

This application is a continuation of International Application No. PCT/CN2022/088248, filed on Apr. 21, 2022, which claims the priority to the Chinese patent application No. 202111138840.0, entitled "Multi-way valve" and filed with the China National Intellectual Property Administration on Sep. 27, 2021. Both of the aforementioned applications are hereby incorporated by reference in their entireties.

TECHNICAL FIELD

This application relates to the technical field of control valves, and in particular to a multi-way valve.

BACKGROUND

In order to enlarge ranges of electric vehicles, it is necessary to achieve a plurality of modes such as heating a battery by a coolant electric heater, dissipating heat of a battery-driving system by a cooler, and heating a battery by waste heat of a driving system.

In order to increase ranges of electric vehicles, in existing coolant circuits of thermal management systems, the above a plurality of modes cannot be achieved by single proportional valves, but combinations of a variety of proportional valves such as two-way proportional valves, three-way proportional valves, and four-way proportional valves are required to achieve the above a plurality of modes.

In the existing technologies, a plurality of valve cores are required to control two-way proportional valves, three-way proportional valves, and four-way proportional valves, resulting in a large occupancy space, complex control, and higher cost.

SUMMARY

This application provides a multi-way valve, including: a valve seat and a valve core rotatably provided inside the valve seat, the valve core has a plurality of rotation positions, the valve seat is provided with a plurality of valve port groups, and each of the valve port groups includes a plurality of valve ports; the valve core is provided with communication structure groups corresponding to the valve port groups, respectively, and each of the communication structure groups includes a plurality of communication structures arranged along a circumferential direction of the valve core. The communication structure groups are configured such that when the valve core is rotated to different rotation positions; each valve port group matches with different communication structures in the communication structure groups to make valve ports in each valve port group form different communication states.

The technical effects of this application are below. The valve core is rotatably disposed in the valve seat, the valve seat is provided with a plurality of valve port groups, each valve port group includes a plurality of valve ports, the valve core is provided with communication structure groups corresponding to the valve port groups, respectively, and each communication structure group further includes a plurality of communication structures arranged along the circumferential direction of the valve core. When the valve core is rotated to different rotation positions, valve ports in different valve port groups form different communication states. Only one valve core is required to make a plurality of valve port groups achieve different communication states, with simple control, compact structure and low cost.

100: multi-way valve; 10: valve core; 11: first communication structure; 12: second communication structure; 13: third communication structure; 13a: first channel; 14: fourth communication structure; 14a: second channel; 15: fifth communication structure; 16: blocking structure; 20: valve seat; 21: first valve port; 22: second valve port; 23: third valve port; 24: fourth valve port; 25: fifth valve port; 26: sixth valve ports; 27: seventh valve port; 28: eighth valve port; 29: ninth valve port; 30: motor; 31: worm; 32: first turbine; 33: first gear; 34: second gear; 35: third gear; 36: fourth gear; 37: fifth gear; 38: sixth gear; 40: pipeline; 50: c-shaped structure; 51: one-line-shaped structure; 52: L-shaped structure; 60: injection mold; 61: first mold; 62: second mold.

DESCRIPTION OF EMBODIMENTS

In order to enlarge ranges of electric vehicles, it is necessary to achieve a plurality of modes such as heating a battery by a coolant electric heater, dissipating heat of a battery-driving system by a cooler, and heating a battery by waste heat of a driving system. In order to increase ranges of electric vehicles, in exiting coolant circuits of thermal management systems, the above a plurality of modes cannot be achieved by single proportional valves, but combinations of a variety of proportional valves such as two-way proportional valves, three-way proportional valves and four-way proportional valves are required to achieve the above a plurality of modes. In the related art, a plurality of valve cores are required to control two-way proportional valves, three-way proportional valves and four-way proportional valves, resulting in a large occupancy space, complex control, and higher cost.

Regarding the above problems, this application provides a multi-way valve, in which a valve core is rotatably disposed on a valve seat, the valve seat is provided with a plurality of valve port groups, each valve port group includes a plurality of valve ports, the valve core is provided with communication structure groups corresponding to the valve port groups, respectively, and each communication structure group further includes a plurality of communication structures arranged along a circumferential direction of the valve core. When the valve core is rotated to different rotation positions, valve ports in each valve port group form different communication states. Only one valve core is required to cause a plurality valve port groups to form different communication states, with simple control, compact structure and low cost.

In order to make the above objectives, features and advantages of the embodiments of this application more clear, the technical solutions in the embodiments of this application will be clearly and completely described below with reference to the accompanying drawings in the embodiments of this application. Apparently, the described embodiments are merely a part rather than all embodiments of this application. All other embodiments obtained by persons of ordinary skill in the art based on embodiments of the present application without creative effort shall fall within the protection scope of the present application.

A multi-way valve according to an embodiment of this application is described below with reference to the accompanying drawings.

Figure 1:
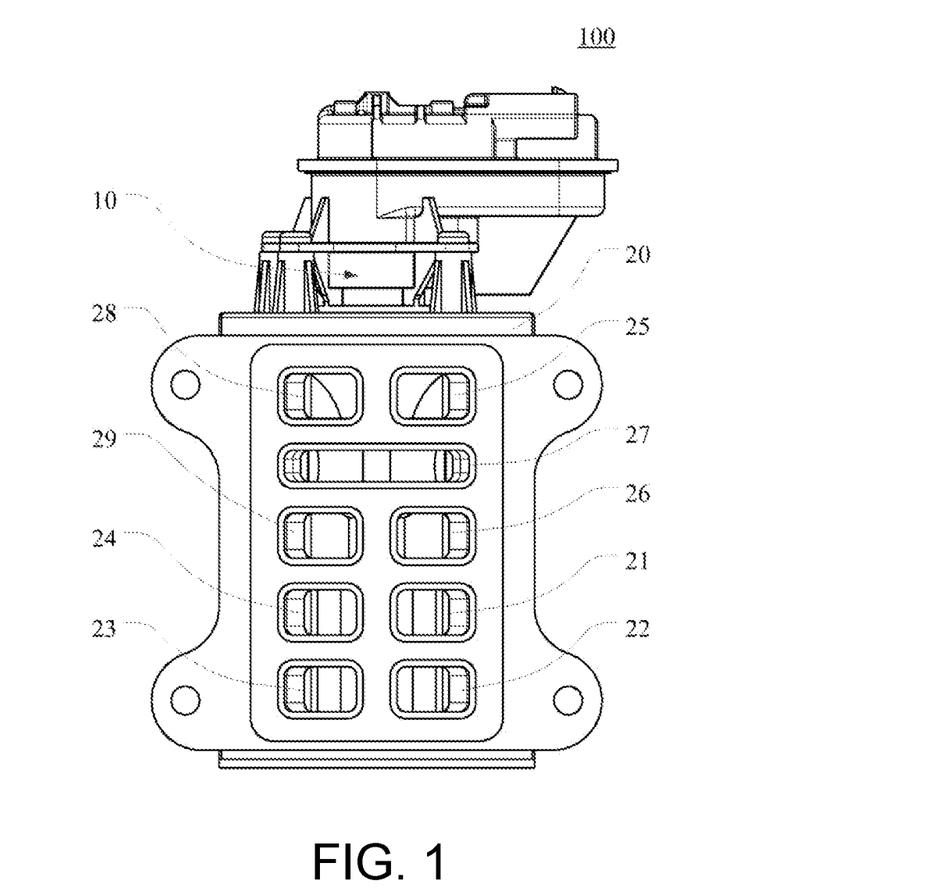
FIG. 1 is a schematic diagram of a multi-way valve according to an embodiment of this application.

Referring to FIG. 1, FIG. 1 is a schematic diagram of a multi-way valve according to an embodiment of this application. A multi-way valve 100 includes a valve seat 20 and a valve core 10 rotatably provided inside the valve seat 20. The valve core 10 has a plurality of rotation positions. The valve seat 20 is provided with a plurality of valve port groups. Each valve port group includes a plurality of valve ports. The valve core 10 is provided with communication structure groups corresponding to valve port groups, respectively, and each communication structure group includes a plurality of communication structures arranged along a circumferential direction of the valve core. The communication structure groups are configured such that when the valve core 10 is rotated to different rotation positions, each valve port group correspondingly matches with different communication structures of the communication structure groups to make valve ports in each valve port group form different communication states.

The valve core 10 is rotatably disposed on the valve seat 20, and the valve seat 20 is provided with a plurality of valve port groups. Each valve port group includes a plurality of valve ports, the valve core 10 is provided with communication structure groups corresponding to the valve port groups, respectively, and each communication structure group further includes a plurality of communication structures arranged along the circumferential direction of the valve core. When the valve core 10 is rotated to different rotation positions, it can be achieved that valve ports of different valve port groups can form different communication states. Only one valve core 10 is required to cause a plurality of valve port groups to form different communication states, with simple control, compact structure and low cost.

Figure 2:
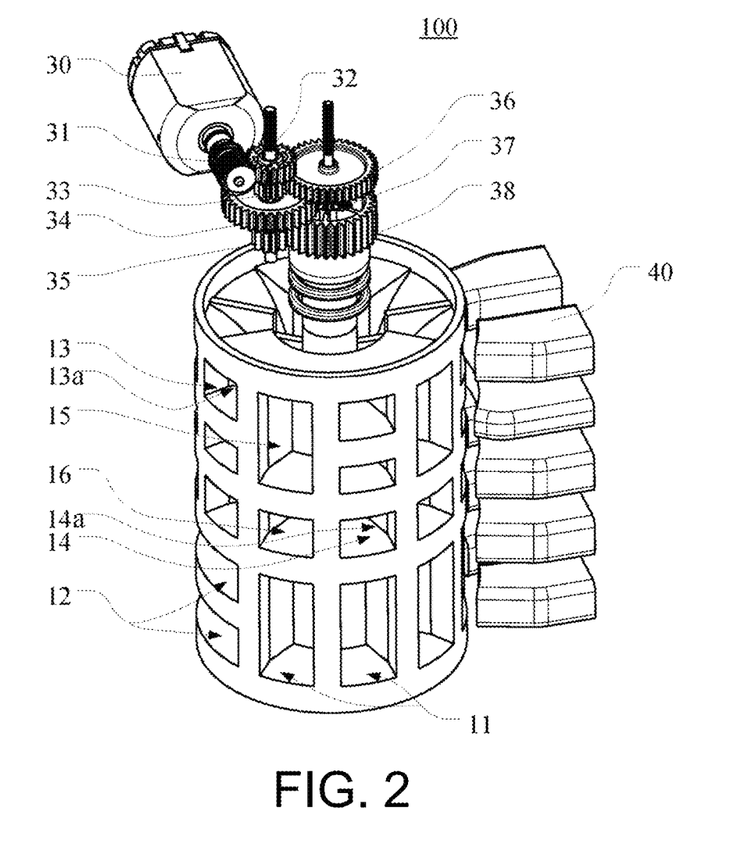
FIG. 2 is a schematic assembly diagram of a valve core and a driving device according to an embodiment of this application.

In an embodiment, referring to FIG. 2, FIG. 2 is a schematic assembly diagram of a valve core and a driving device according to an embodiment of this application. A plurality of valve port groups include a first valve port group, and the plurality of valve ports in the first valve port group include a first valve port 21, a second valve port 22, a third valve port 23, and a fourth valve port 24, which are arranged in a four-corner layout. The four valve ports in the first valve port group are equivalent to a four-way proportional valve to achieve the communication between the first valve port 21 and the second valve port 22, the communication between the first valve port 21 and the fourth valve port 24, the communication between the second valve port 22 and the third valve port 23, and the communication between the third valve port 23 and the fourth valve port 24.

The four valve ports in the first valve port group are arranged in a four-corner layout in order to form different communication states of the first valve port group. A plurality of communication structure groups include a first communication structure group. The first communication structure group includes a first communication structure 11 and a second communication structure 12, which are arranged along the circumferential direction of the valve core 10. The first communication structure 11 includes two first grooves provided on an outer peripheral surface of the valve core 10 and arranged at intervals along the circumferential direction of the valve core 10, and the first grooves extend along an axial direction of the valve core 10. The second communication structure 12 includes two second grooves provided on the outer circumferential surface of the valve core 10 and arranged at intervals along the axial direction of the valve core 10, and the second grooves extend along the circumferential direction of the valve core 10. When the valve core 10 is rotated to allow the first communication structure 11 to match with the first valve port group, the first valve port 21 is in communication with the second valve port 22 and the third valve port 23 is in communication with the fourth valve port 24 by the two first grooves of the first communication structure 11, respectively. When the valve core 10 is rotated to allow the second communication structure 12 to match with the first valve port group, the first valve port 21 is in communication with the fourth valve port 24 and the second valve port 22 is in communication with the third valve port 23 by the two second grooves of the second communication structure 12, respectively.

Figure 8:
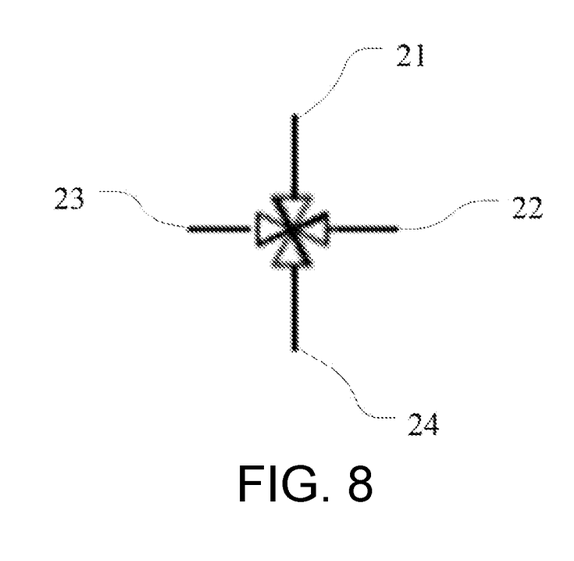
FIG. 8 is a principle schematic diagram of a flow path of a four-way proportional valve according to an embodiment of this application.

The matching between the first valve port group on the valve core 10 and the first communication structure or the second communication structure of the first communication structure group on the valve seat 20 can achieve the communication between the first valve port 21 and the second valve port 22, the communication between the first valve port 21 and the fourth valve port 24, the communication between the second valve port 22 and the third valve port 23, and the communication between the third valve port 23 and the fourth valve port 24. Referring to FIG. 8, FIG. 8 is a schematic principle diagram of a flow path of a four-way proportional valve according to an embodiment of this application, in which a first valve port group matches with a first communication structure or a second communication structure of a first communication structure group, which is equivalent to achieving the function of a four-way proportional valve.

In an embodiment, a plurality of valve port groups include a second valve port group, and the second valve port group includes a fifth valve port 25 and a sixth valve port 26, which are arranged at intervals along the axial direction of the valve core 10. The fifth valve port 25 is in communication with the sixth valve port 26, or both the fifth valve port 25 and the sixth valve port 26 are blocked. The two valve ports of the second valve port group are equivalent to a two-way proportional valve.

A plurality of communication structure groups include a second communication structure group, and the second communication structure group includes a third communication structure 13 and a blocking structure 16, which are arranged along the circumferential direction of the valve core 10. In an embodiment, in order to allow the fifth valve port 25 to communicate with the sixth valve port 26, the third communication structure 13 includes two third grooves disposed on the outer peripheral surface of the valve core 10 and arranged at intervals along the axial direction of the valve core 10, and a first channel penetrating groove bottoms of the two third grooves to make the two third grooves communicate with each other. When the valve core 10 is rotated to allow the third communication structure 13 to match with the second valve port group, the two third grooves of the third communication structure 13 match with the fifth valve port 25 and the sixth valve port 26 respectively, to make the fifth valve port 25 communicate with the sixth valve port 26. In order to block both the fifth valve port 25 and the sixth valve port 26, when the valve core 10 is rotated to allow the blocking structure 16 to match with the second valve port group, the fifth valve port 25 and the sixth valve port 26 are blocked by the blocking structure 16.

Figure 6:
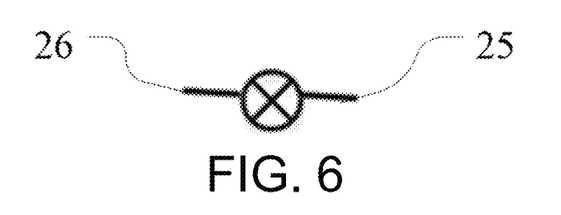
FIG. 6 is a principle schematic diagram of a flow path of a two-way proportional valve according to an embodiment of this application.

The matching between the second valve port group on the valve core 10 and the second communication structure group on the valve seat 20 can achieve the communication between the fifth valve port 25 and the sixth valve port 26, or the blocking of both the fifth valve port 25 and the sixth valve port 26. Referring to FIG. 6, FIG. 6 is a schematic principle diagram of a flow path of a two-way proportional valve according to an embodiment of this application, in which two valve ports of the second valve port group are equivalent to achieving the function of a two-way proportional valve.

It should be noted that the blocking structure 16 can be configured as any structure capable of blocking the fifth valve port 25 and the sixth valve port 26. In an embodiment, the blocking structure 16 may be grooves provided on the outer peripheral surface of the valve core 10 and arranged along the circumferential direction of the valve core 10. The blocking structure 16 can also be formed by the outer peripheral surface of the valve core 10.

A plurality of valve port groups include a third valve port group, and the third valve port group includes an eighth valve port 28, a seventh valve port 27, and a ninth valve port 29, which are arranged at intervals along the axial direction of the valve core 10. It is necessary to achieve the communication between the eighth valve port 28 and the seventh valve port 27 and the communication between the eighth valve port 28 and the ninth valve port 29. The three valve ports of the third valve port group are equivalent to a three-way proportional valve.

A plurality of communication structure groups include a third communication structure group, and the third communication structure group includes a fourth communication structure 14 and a fifth communication structure 15, which are arranged along the circumferential direction of the valve core 10. In order to achieve the communication between the eighth valve port 28 and the ninth valve port 29 that are arranged at intervals, in an embodiment, the fourth communication structure 14 includes two fourth grooves provided on the outer peripheral surface of the valve core 10 and arranged at intervals along the axial direction of the valve core 10, and a second channel penetrating groove bottoms of the two fourth grooves to make the two fourth grooves communicate with each other. In order to achieve the communication between the eighth valve port 28 and the seventh valve port 27, the fifth communication structure 15 includes a fifth groove extending along the axial direction of the valve core 10. When the valve core 10 is rotated to allow the fourth communication structure 14 to match with the third valve port group, the two fourth grooves of the fourth communication structure 14 match with the eighth valve port 28 and the ninth valve port 29 respectively, to make the eighth valve port 28 communicate with the seventh valve port 27. When the valve core 10 is rotated to allow the fifth communication structure 15 to match with the third valve port group, the eighth valve port 28 is in communication with the seventh valve port 27 by the fifth groove of the fifth communication structure.

Figure 7:
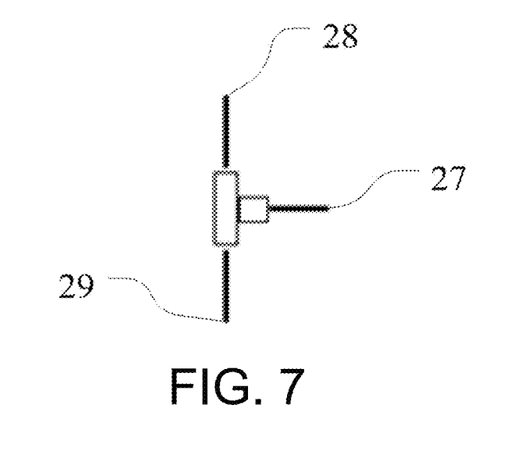
FIG. 7 is a principle schematic diagram of a flow path of a three-way proportional valve according to an embodiment of this application.

The matching between the third valve port group on the valve core 10 and the third communication structure group on the valve seat 20 can achieve the communication between the eighth valve port 28 and the seventh valve port 27, or the communication between the eighth valve port 28 and the ninth valve port 29. Referring to FIG. 7, FIG. 7 is a schematic principle diagram of a flow path of a three-way proportional valve according to an embodiment of this application, in which three valve ports of a third valve port group are equivalent to a three-way proportional valve.

The first valve port 21, the second valve port 22, the third valve port 23, and the fourth valve port 24 in the first valve port group, and the fifth valve port 25 and the sixth valve port 26 in the second valve port group, and the seventh valve port 27, the eighth valve port 28 and the ninth valve port 29 in the third valve port group are collectively provided on a same side of the valve seat 20, which facilitates the layout of a pipeline 40 and reduces space.

The third communication structure 13 in the second communication structure group and the fourth communication structure 14 in the third communication structure group are configured to make two valve ports provided at intervals on the valve seat 20 communicate with each other. The third communication structure 13 and the fourth communication structure 14 can be configured as any structure that can meet the above requirements. In an embodiment, the third communication structure 13 and the fourth communication structure 14 have same structures. Each of the third communication structure 13 and the fourth communication structure 14 includes two grooves provided on the outer peripheral surface of the valve core 10 and arranged at intervals along the axial direction of the valve core 10, and a channel penetrating groove bottoms of the two grooves to make the two grooves communicate with each other.

In an embodiment, a structure can be the third communication structure 13 or the fourth communication structure 14. The third communication structure 13 can be used as the fourth communication structure 14, and the fourth communication structure 14 can also be used as the third communication structure 13, and the third communication structure 13 and the fourth communication structure 14 can be shared.

In an embodiment, the eighth valve port 28 and the fifth valve port 25 are located at positions having the same height along the axial direction of the valve core 10, and the eighth valve port 28 and the fifth valve port 25 are arranged at intervals along the circumferential direction of the valve core 10. The ninth valve port 29 and the sixth valve port 26 are located at positions having the same height along the axial direction of the valve core 10, and the ninth valve port 29 and the sixth valve port 26 are arranged at intervals along the circumferential direction of the valve core 10. Since the third communication structure 13 and the fourth communication structure 14 have same structures, such arrangement enables the eighth valve port 28, the ninth valve port 29 to match with the fourth communication structure 14, and also to match with the third communication structure 13, and enables the fifth valve port 25 and the sixth valve port 26 to match with the third communication structure 13, and also to match with the fourth communication structure 14, when the valve core 10 is rotated to different predetermined positions. The third communication structure 13 and the fourth communication structure 14 have the same function and the same structures, so the third communication structure 13 and the fourth communication structure 14 can be shared, so that the valve core 10 has good commonality.

Figure 3:
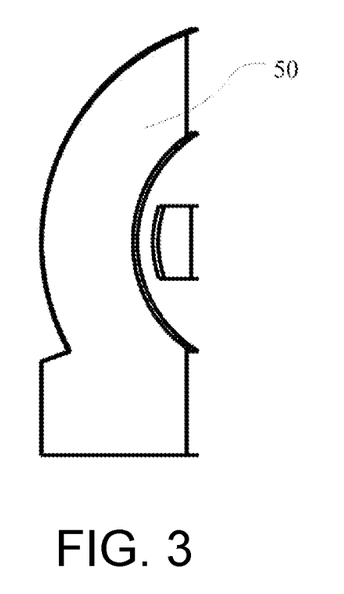
FIG. 3 is a schematic diagram of a C-shaped structure according to an embodiment of this application.
Figure 4:
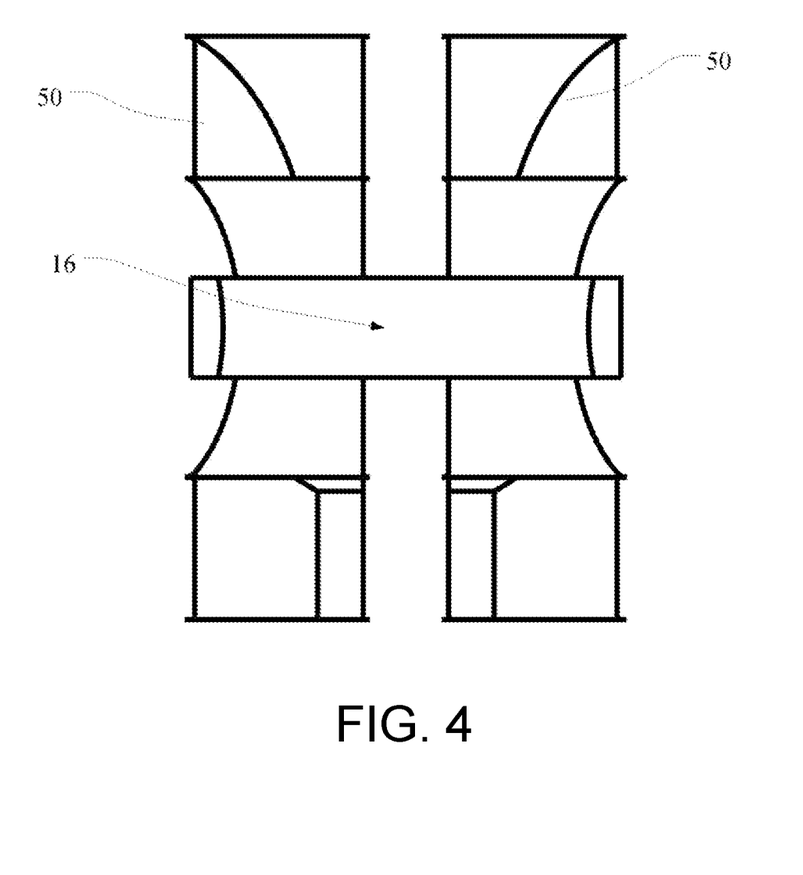
FIG. 4 is a schematic diagram of a double C-shaped structure according to an embodiment of this application.
Figure 5:
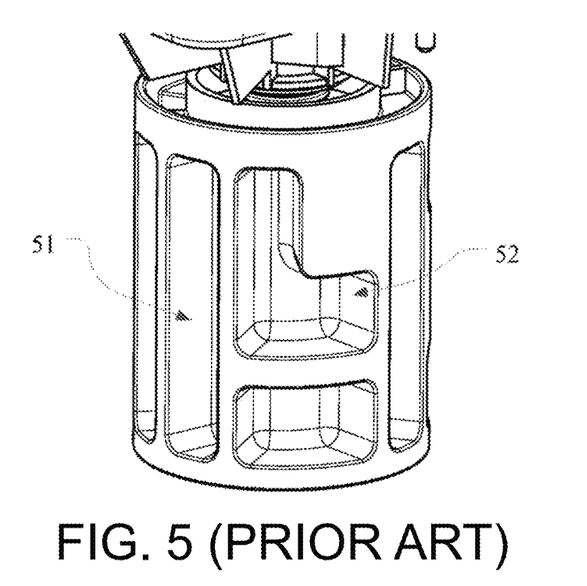
FIG. 5 is a schematic diagram of a one-line-shaped structure and an L-shaped structure in the related art.

Each of the third communication structure 13 and the fourth communication structure 14 is used to make two grooves provided at intervals on the valve core 10 communicate with each other. Referring to FIG. 3, FIG. 4 and FIG. 5, FIG. 3 is a schematic diagram of a C-shaped structure according to an embodiment of this application. FIG. 4 is a schematic diagram of a double C-shaped structure according to an embodiment of this application. FIG. 5 is a schematic diagram of a one-line-shaped structure and an L-shaped structure in the related art. In the related art, the one-line-shaped structure 51 is used to achieve the communication between two grooves connected, and the L-shaped structure 52 is used to achieve the communication between grooves arranged in a right angle layout. In an embodiment, each of the third communication structure 13 and the fourth communication structure 14 can be configured as a C-shaped structure 50, with both ends communicating with two grooves. A blocking structure 16 can be provided in the middle of the combination of two C-shaped structures 50. When two C-shaped structures 50 can make the fifth valve port 25 communicate with the sixth valve port 26, and make the eighth valve port 28 communicate with the ninth valve port 29, the blocking structure 16 in the middle is used to block the seventh valve port 27.

Figure 9:
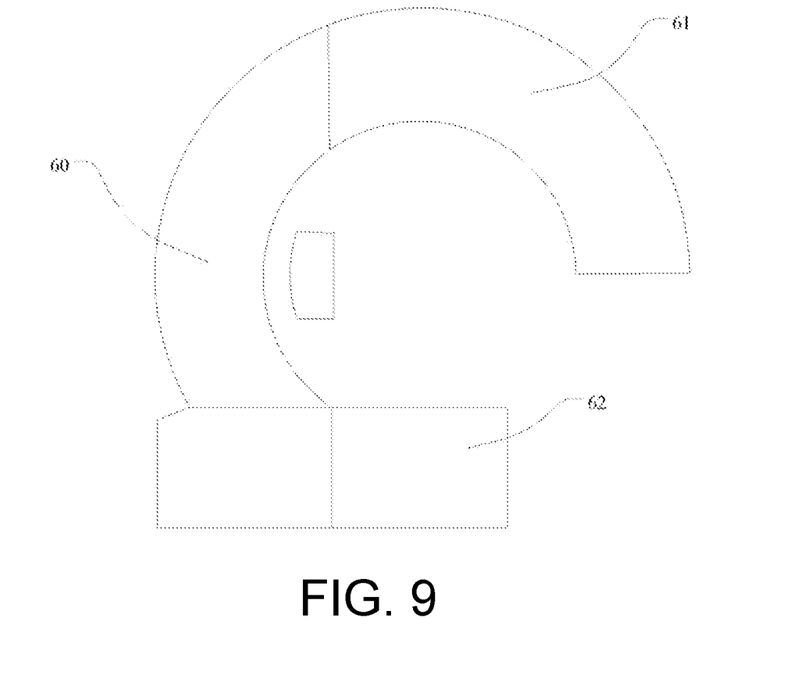
FIG. 9 is a schematic diagram of an injection mold according to an embodiment of this application.

In an embodiment, the C-shaped structure 50 is prepared by an injection molding process, and this process has fast production speed and high efficiency, and can easily form parts with complex shapes. Referring to FIG. 9, FIG. 9 is a schematic diagram of an injection mold according to an embodiment of this application, in which an injection mold 60 used includes a first mold 61 and a second mold 62. The first mold 61 adopts a C-shaped annular slider, and the second mold 62 adopts a straight slider. During the injection molding process, the first mold 61 is connected with the second mold 62. After the injection molding is completed, when the molds are removed, the first mold 61 is removed to a side away from the third communication structure 13 in the horizontal line, and the second mold 62 is removed by rotating around a circumference.

As shown in FIG. 1, the seventh valve port 27 has a narrow width in the axial direction of the valve core 10. In an embodiment, in order to ensure that the flow area of the seventh valve port 27 is not reduced, the seventh valve port 27 extends along the circumferential direction of the valve core 10 to be located between the fifth valve port 25 and the sixth valve port 26.

On the outer peripheral surface of the valve core 10, a first-column communication structure group, a second-column communication structure group, a third-column communication structure group, a fourth-column communication structure group, a fifth-column communication structure group, a sixth-column communication structure group, a seventh-column communication structure group, an eighth-column communication structure group, a ninth-column communication structure group, and tenth-column communication structure group are arranged sequentially along the circumferential direction of the valve core. The first-column communication structure group is provided with one fifth communication structure 15, one blocking structure 16, and one first groove of one first communication structure 11, which are arranged at intervals along the axial direction of the valve core 10; and the second-column communication structure group is provided with three blocking structures 16 and the other first groove of the first communication structure 11, which are arranged at intervals along the axis of the valve core 10. The third-column communication structure group is provided with one fifth communication structure 15, one blocking structure 16, and one first groove of one first communication structure 11, which are arranged at intervals along the axial direction of the valve core 10; and the fourth-column communication structure group is provided with one third communication structure 13, one blocking structure 16 and the other first groove of the first communication structure 11, which are arranged at intervals along the axial direction of the valve core 10, and the blocking structure 16 is located between two third grooves of the third communication structure 13. The fifth-column communication structure group is provided with one fourth communication structure 14, one blocking structure 16, and one first groove of one first communication structure 11, which are arranged at intervals along the axial direction of the valve core 10, and the blocking structure 16 is located between two fourth grooves of the fourth communication structure 14; and the sixth-column communication structure group is provided with three blocking structures 16 and the other first groove of the first communication structure 11, which are arranged at intervals along the axial direction of the valve core 10. The seventh-column communication structure group is provided with one fifth communication structure 15, one blocking structure 16, and one second communication structure 12, which are arranged at intervals along the axial direction of the valve core 10. The eighth-column communication structure group is provided with one third communication structure 13, one blocking structure 16, and one second communication structure 12, which are arranged at intervals along the axial direction of the valve core 10, and the blocking structure 16 is located between two third grooves of the third communication structure 13. The ninth-column communication structure group is provided with one fourth communication structure 14, one blocking structure 16, and one second communication structure 12, which are arranged at intervals along the axial direction of the valve core 10, and the blocking structure 16 is located between two fourth grooves of the fourth communication structure 14. The tenth-column communication structure group is provided with three blocking structures 16 and one second communication structure 12, which are arranged at intervals along the axial direction of the valve core 10. It should be noted that the seventh-column communication structure group, the eighth-column communication structure group, the ninth-column communication structure group, and the tenth-column communication structure group share a second communication structure 12.

Only one valve core 10 and one driving device are required to control two-way proportional valves, three-way proportional valves, and four-way proportional valves, with simple control, compact structure and low cost. By adjusting the rotation angle of the valve core 10, seven different working conditions can be achieved by the multi-way valve 100.

The first working condition is that the first valve port 21 is in communication with the second valve port 22, the third valve port 23 is in communication with the fourth valve port 24, the fifth valve port 25 is in communication with the sixth valve port 26, the seventh valve port 27 is in communication with the eighth valve port 28, and the ninth valve port 29 is blocked. When the valve core 10 is rotated to the first predetermined position, the first valve port 21 and the second valve port 22 match with the first groove of the first communication structure 11, the third valve port 23 and the fourth valve port 24 match with the other first groove of the communication structure 11, the fifth valve port 25 and the sixth valve port 26 match with the third communication structure 13, the seventh valve port 27 and the eighth valve port 28 match with the fifth communication structure 15, and the ninth valve port 29 matches with the blocking structure 16 to block the ninth valve port 29.

The second working condition is that the first valve port 21 is in communication with the fourth valve port 24, the second valve port 22 is in communication with the third valve port 23, the fifth valve port 25 is in communication with the sixth valve port 26, the seventh valve port 27 is in communication with the eighth valve port 28, and the ninth valve port 29 is blocked. When the valve core 10 is rotated to the second predetermined position, the first valve port 21 and the fourth valve port 24 match with the second groove of the second communication structure 12, the second valve port 22 and the third valve port 23 match with the other second groove of the second communication structure 12, the fifth valve port 25 and the sixth valve port 26 match with the third communication structure 13, the seventh valve port 27 and the eighth valve port 28 match with the fifth communication structure 12, and the ninth valve port 29 matches with the blocking structure 16 to block the ninth valve port 29.

The third working condition is that the first valve port 21 is in communication with the second valve port 22, the third valve port 23 is in communication with the fourth valve port 24, the fifth valve port 25 is in communication with the sixth valve port 26, the eighth valve port 28 is in communication with the ninth valve port 29, and the seventh valve port 27 is blocked. When the valve core 10 is rotated to the third predetermined position, the first valve port 21 and the second valve port 22 match with the first groove of the first communication structure 11, the third valve port 23 and the fourth valve port 24 match with the other first groove of the first communication structure 11, the fifth valve port 25 and the sixth valve port 26 match with the third communication structure 13, the eighth valve port 28 and the ninth valve port 29 match with the fourth communication structure 14, and the seventh valve port 27 matches with the blocking structure 16 to block the seventh valve port 27.

The fourth working condition is that the first valve port 21 is in communication with the fourth valve port 24, the second valve port 22 is in communication with the third valve port 23, the fifth valve port 25 is in communication with the sixth valve port 26, the eighth valve port 28 is in communication with the ninth valve port 29, and the seventh valve port 27 is blocked. When the valve core 10 is rotated to the fourth predetermined position, the first valve port 21 and the fourth valve port 24 match with the second groove of the second communication structure 12, the second valve port 22 and the third valve port 23 match with the other second groove of the second communication structure 12, the fifth valve port 25 and the sixth valve port 26 match with the third communication structure 13, the eighth valve port 28 and the ninth valve port 29 match with the fourth communication structure 14, and the seventh valve port 27 matches with the blocking structure 16 to block the seventh valve port 27.

The fifth working condition is that the first valve port 21 is in communication with the second valve port 22, the third valve port 23 is in communication with the fourth valve port 24, the eighth valve port 28 is in communication with the ninth valve port 29, and the fifth valve port 25, the sixth valve port 26 and the seventh valve port 27 are blocked. When the valve core 10 is rotated to the fifth predetermined position, the first valve port 21 and the second valve port 22 match with the first groove of the first communication structure 11, the third valve port 23 and the fourth valve port 24 match with the other first groove of the first communication structure 11, the eighth valve port 28 and the ninth valve port 29 match with the fourth communication structure 14, and the fifth valve port 25, the sixth valve port 26, and the seventh valve port 27 match with the blocking structure 16 to block the fifth valve port 25, the sixth valve port 26, and the seventh valve port 27, respectively.

The sixth working condition is that the first valve port 21 is in communication with the second valve port 22, the third valve port 23 is in communication with the fourth valve port 24, the seventh valve port 27 is in communication with the eighth valve port 28, and the fifth valve port 25, the sixth valve port 26, and the ninth valve port 29 are blocked. When the valve core 10 is rotated to the sixth predetermined position, the first valve port 21 and the second valve port 22 match with the first groove of the first communication structure 11, the third valve port 23 and the fourth valve port 24 match with the other first groove of a communication structure 11, the seventh valve port 27 and the eighth valve port 28 match with the fifth communication structure 15, and the fifth valve port 25, the sixth valve port 26, and the ninth valve port 29 match with the blocking structure 16 to block the fifth valve port 25, the sixth valve port 26, and the ninth valve port 29, respectively.

The seventh working condition is that the first valve port 21 is in communication with the fourth valve port 24, the second valve port 22 is in communication with the third valve port 23, the seventh valve port 27 is in communication with the eighth valve port 28, and the fifth valve port 25, the sixth valve port 26, and the ninth valve port 29 are blocked. When the valve core 10 is rotated to the seventh predetermined position, the first valve port 21 and the fourth valve port 24 match with the second groove of the second communication structure 12, the second valve port 22 and the third valve port 23 match with the other second groove of the communication structure 12, the seventh valve port 27 and the eighth valve port 28 match with the fifth communication structure 15, and the fifth valve port 25, the sixth valve port 26, and the ninth valve port 29 match with the blocking structure 16 to block the fifth valve port 25, the sixth valve port 26, and the ninth valve port 29, respectively.

In order to achieve the rotation of the valve core 10 to different rotation positions, the valve seat 20 is provided with a driving device, and the driving device is connected to the valve core 10 in a transmission way.

The driving device can be configured as any structure capable of driving the valve core 10 to rotate. In an embodiment, referring to FIG. 2, a driving device includes a motor 30 and a gear group connected to the motor 30 in a transmission way, and the gear group is connected to the valve core 10 in a transmission way A worm 31 is provided on a shaft of the motor 30, and the gear group includes a first gear group 33 and a second gear group 34. The first gear group 33 includes a first turbine 32, a first gear 33, a second gear 34, and a third gear 35, which are sequentially connected in series on the same central axis. The second gear group 34 includes a fourth gear 36, a fifth gear 37, and a sixth gear 38, which are sequentially connected in series on the same central axis. The worm 31 on the shaft of the motor 30 meshes with the first turbine 32, the first gear 33 meshes with the fourth gear 36, the second gear 34 meshes with the fifth gear 37, and the third gear 35 meshes with the sixth gear 38. The central axis of the first gear group 33 and the central axis of the second gear group 34 are parallel to each other along the vertical direction. The central axis of the first worm 31 and the central axis of the first turbine 32 are perpendicular to each other.

In order to achieve the connection between the valve core 10 and the sixth gear 38, in an embodiment, the valve core 10 is provided with a first connection part, and the sixth gear 38 is provided with a second connection part, and the first connection part can form a detachable connection with the second connection part.

In an embodiment, the first connection part includes a spline shaft disposed on an end surface of the valve core 10, the second connection part includes a spline sleeve disposed on the sixth gear 38, and the spline shaft and the spline sleeve form a detachable connection.

In an embodiment, the multi-way valve 100 can be used in a coolant circuit of a thermal management system of an electric vehicle, so that the electric vehicle has the advantages of being lighter in weight and cost saving. Compared with electric vehicles that require three driving devices to control a four-way valve, a three-way proportional valve, and a two-way proportional valve, an average of 200 yuan per vehicle is saved and 500 g per vehicle in weight is reduced in electric vehicles having the multi-way valve 100.

Examples or embodiments in this specification are described in a progressive manner. Each example is emphatically described in the difference over other examples, and the same and similar contents between various examples can be referred to each other.

In the description of this specification, the descriptions with reference to the terms "one example," "some embodiments," "schematic embodiments," "an example," "a specific example," or "some examples" are intended to indicate that specific features, structures, materials, or characteristics described in combination with embodiments or examples are included in at least one embodiment or example of the application. In this specification, schematic description of the above terms does not necessarily refer to the same embodiment or example. Furthermore, the specific features, structures, materials, or characteristics described may be combined in any suitable manner in any one or more embodiments or examples.

Finally, it should be noted that the foregoing embodiments are merely intended for describing the technical solutions of the present application other than limiting the present application. Although this application has been described in detail with reference to the foregoing embodiments, those skilled in the art should understand that they may still make modifications to the technical solutions described in the foregoing embodiments, or make equivalent substitutions to some or all of the technical features thereof, and these modifications or substitutions would not cause the essence of the corresponding technical solutions to depart from the scope of the technical solutions of embodiments of this application.

What is claimed is:

1. A multi-way valve, comprising a valve seat and a valve core rotatably provided inside the valve seat; the valve core has a plurality of rotation positions, and the valve seat is provided with a plurality of valve port groups, and each of the valve port groups comprises a plurality of valve ports;

the valve core is provided with communication structure groups corresponding to the valve port groups, respectively, and each of the communication structure groups comprises a plurality of communication structures arranged along a circumferential direction of the valve core;

the communication structure groups are configured such that when the valve core is rotated to different rotation positions, each valve port group matches with different communication structures in the communication structure groups to make valve ports in each valve port group form different communication states;

wherein the plurality of valve port groups comprise a first valve port group, and a plurality of valve ports in the first valve port group comprise a first valve port, a second valve port, a third valve port, and a fourth valve port, which are arranged in a four-corner layout;

the plurality of communication structure groups comprise a first communication structure group, and the first communication structure group comprises a first communication structure and a second communication structure that are arranged along the circumferential direction of the valve core; the first communication structure comprises two first grooves provided on an outer peripheral surface of the valve core and arranged at intervals along the circumferential direction of the valve core, and the first grooves extend along an axial direction of the valve core; the second communication structure comprises two second grooves provided on the outer peripheral surface of the valve core and arranged at intervals along the axial direction of the valve core, and the second grooves extend along the circumferential direction of the valve core;

when the valve core is rotated to allow the first communication structure to match with the first valve port group, the first valve port is in communication with the second valve port and the third valve port is in communication with the fourth valve port by the two first grooves of the first communication structure, respectively; or when the valve core is rotated to allow the second communication structure to match with the first valve port group, the first valve port is in communication with the fourth valve port and the second valve port is in communication with the third valve port by the two second grooves of the second communication structure, respectively;

wherein the plurality of valve port groups comprise a second valve port group, and the second valve port group comprises a fifth valve port and a sixth valve port that are arranged at intervals along the axial direction of the valve core;

the plurality of communication structure groups comprise a second communication structure group, and the second communication structure group comprises a third communication structure and a blocking structure that are arranged along the circumferential direction of the valve core;

the third communication structure comprises two third grooves provided on the outer peripheral surface of the valve core and arranged at intervals along the axial direction of the valve core, and a first channel which is configured to penetrate groove bottoms of the two third grooves to make the two third grooves communicate with each other;

when the valve core is rotated to allow the third communication structure to match with the second valve port group, the two third grooves of the third communication structure match with the fifth valve port and the sixth valve port, respectively, so that the fifth valve port is in communication with the sixth valve port;

when the valve core is rotated to allow the blocking structure to match with the second valve port group, the fifth valve port and the sixth valve port are blocked by the blocking structure.

2. The multi-way valve according to claim 1, wherein the plurality of valve port groups comprise a third valve port group, and the third valve port group comprises a eighth valve port, a seventh valve port, and a ninth valve port, which are arranged at intervals along the axial direction of the valve core;

the plurality of communication structure groups comprise a third communication structure group, and the third communication structure group comprises a fourth communication structure and a fifth communication structure that are arranged along the circumferential direction of the valve core;

the fourth communication structure comprises two fourth grooves provided on the outer peripheral surface of the valve core and arranged at intervals along the axial direction of the valve core, and a second channel which is configured to penetrate groove bottoms of the two fourth grooves to make the two fourth grooves communicate with each other; the fifth communication structure comprises a fifth groove extending along the axial direction of the valve core;

when the valve core is rotated to allow the fourth communication structure to match with the third valve port group, the two fourth grooves in the fourth communication structure match with the eighth valve port and the ninth valve port, respectively, so that the eighth valve port is in communication with the ninth valve port;

when the valve core is rotated to allow the fifth communication structure to match with the third valve port group, the eighth valve port is in communication with the seventh valve port by the fifth groove of the fifth communication structure.

3. The multi-way valve according to claim 2, wherein the eighth valve port and the fifth valve port are located at positions having a same height in the axial direction of the valve core, and the eighth valve port and the fifth valve port are arranged at intervals along the circumferential direction of the valve core;

the ninth valve port and the sixth valve port are located at positions having a same height in the axial direction of the valve core, and the ninth valve port and the sixth valve port are arranged at intervals along the circumferential direction of the valve core.

4. The multi-way valve according to claim 3, wherein the third communication structure in the second communication structure group and the fourth communication structure in the third communication structure group are shared.

5. The multi-way valve according to claim 3, wherein the seventh valve port extends along the circumferential direction of the valve core to be located between the fifth valve port and the sixth valve port.

6. The multi-way valve according to claim 3, wherein the first valve port group and the second valve port group are arranged at intervals along the axial direction of the valve core.

7. The multi-way valve according to claim 1, wherein the plurality of the valve port groups are provided on a same side of the valve seat.

8. The multi-way valve according to claim 1, wherein the valve seat is provided with a driving device, and the driving device is connected to the valve core in a transmission way.

\* \* \* \* \*